United States Patent [19]

Motooka

[11] Patent Number: 4,703,179

[45] Date of Patent: Oct. 27, 1987

[54] SENSOR FOR HEMISPHERICAL APPLICATIONS

[75] Inventor: Wesley D. Motooka, Irvine, Calif.

[73] Assignee: Ford Aerospace & Communications Corporation, Detroit, Mich.

[21] Appl. No.: 33,390

[22] Filed: Apr. 2, 1987

[51] Int. Cl.$^4$ ............................................. G02B 26/10
[52] U.S. Cl. .................................... 250/334; 250/330; 358/213.11
[58] Field of Search ...................... 250/334, 332, 330; 358/113, 109, 213.19, 213.11, 213.26, 225, 199, 204

[56] References Cited

U.S. PATENT DOCUMENTS

| | | | |
|---|---|---|---|
| 3,318,650 | 5/1967 | Papp | 350/6.9 |
| 3,843,076 | 10/1974 | King et al. | 244/3.16 |
| 3,889,117 | 6/1975 | Shaw, Jr. | 250/334 |
| 4,054,797 | 10/1977 | Milton et al. | 250/332 |
| 4,193,688 | 3/1980 | Watkins | 250/332 |
| 4,227,077 | 10/1980 | Hopson et al. | 250/203 R |
| 4,237,383 | 12/1980 | Kosonocky et al. | 358/213.26 |
| 4,375,652 | 3/1983 | White | 358/213.11 |
| 4,382,267 | 5/1983 | Angle | 358/213.19 |
| 4,397,430 | 8/1983 | Heidmann et al. | 244/3.16 |
| 4,442,457 | 4/1984 | Pines | 358/213.26 |
| 4,537,370 | 8/1985 | Pizzurro | 244/3.16 |
| 4,670,653 | 6/1987 | McConkle et al. | 250/332 |

Primary Examiner—Janice A. Howell
Assistant Examiner—William F. Rauchholz
Attorney, Agent, or Firm—E. J. Radlo; K. L. Zerschling

[57] ABSTRACT a ratating sensor responsive to infrared or electro-optic radiation has a nearly hemispherical field of view. The sensor comprises a rotating platform (3) supporting a planar multidetector focal plane array (1). The array (1) has three or four sides. Two of the sides are straight lines. One or two sides are portions of conic sections. Individual detectors (2) within the array (1) can be continuous or discrete, and are organized into rows generally following the shape of the conic section(s). In either embodiment, time delay integration is performed row by row within the array (1) so as to equalize the sensitivity and resolution for each portion of the viewed scene. Several arrays (1) can be mounted within the carrier vehicle (8), mounted at different field angles. In this embodiment, the shape of the arrays (1) vary from a sector of a circle to rectangular.

9 Claims, 12 Drawing Figures

SENSOR LOCATION

FIG.9
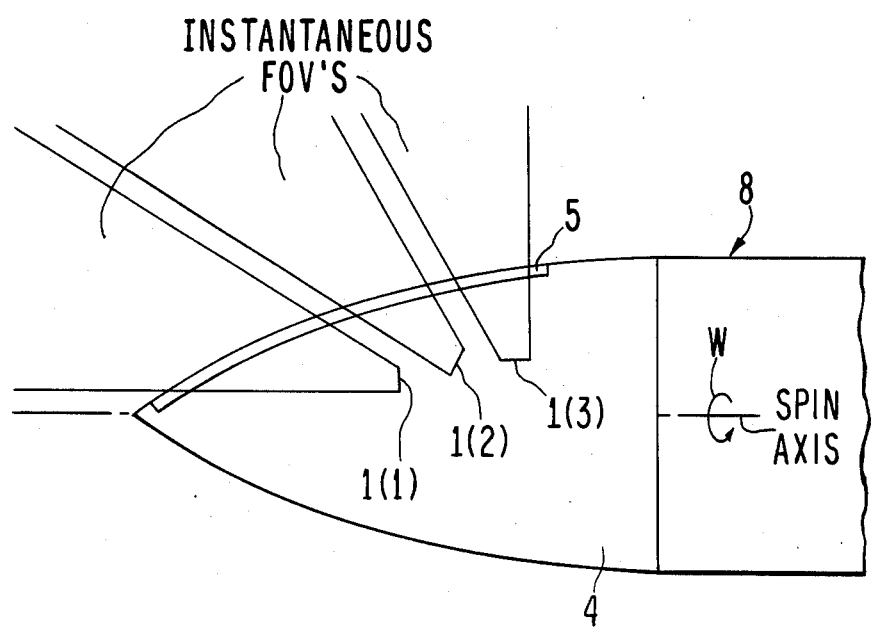
FIG.10　　FIG.11　　FIG.12
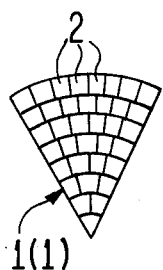
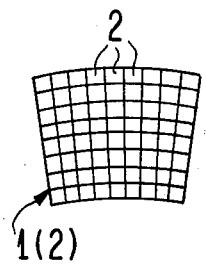
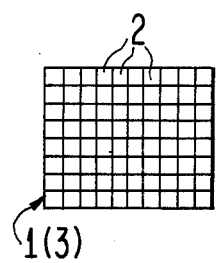

SENSOR FOR HEMISPHERICAL APPLICATIONS

TECHNICAL FIELD

This invention pertains to the field of using an electro-optical or infrared sensor to detect radiation throughout a hemispherical field of view.

BACKGROUND ART

U.S. Pat. No. 3,843,076 discloses a terminal guidance scheme which differs from the present invention in that: (1) it is an active system requiring a light source, rather than a passive system which senses ambient radiation; (2) it is not capable of performing imaging; (3) it does not employ TDI (Time Delay Integration); (4) it is designed for use just on a missile rather than an airplane or other vehicle; and (5) it is a seeker used for one target, rather than a searcher which searches for several targets.

U.S. Pat. No. 4,397,430 discloses a homing system having a sensor which differs from the present invention in that: (1) constant sensitivity is not achieved for all points within the viewed scene (see FIG. 6) because the detector elements towards the middle of circle 4 observe the scene for a longer period of time than those towards the edge; (2) TDI is not employed; and (3) the detector comprises a single row of detector elements rather than a focal plane array comprising several rows of detector elements.

U.S. Pat. No. 4,193,688 discloses an optical scanning system which differs from the present invention in that: (1) the detector comprises a single row of detector elements, rather than a focal plane array comprising several rows of detector elements; (2) the detector does not attain constant sensitivity at all points in the viewed scene; and (3) TDI is not performed.

U.S. Pat. No. 4,227,077 discloses an optical tracking system which differs from the present invention in that: (1) it comprises a nutating seeker and tracker, as opposed to a rotating sensor; (2) it does not employ TDI; and (3) it uses hexagonally spaced detectors, as opposed to a focal plane array having the shape of a sector of a figure formed by up to two conic sections.

Secondary references are U.S. Pat. Nos. 3,318,650 and 4,537,370.

DISCLOSURE OF INVENTION

The present invention is a rotating sensor for imaging throughout a nearly hemispherical field of view. The sensor comprises a platform (3) which rotates about a spin axis at a constant angular rate (W). Mounted on the platform (3) is a planar multi-detector array (1) having the shape of a sector of a figure formed by one or two conic sections. The array (1) comprises many individual detector elements (2) arranged in rows which generally follow the curvature of the conic section(s). Time delay integration (TDI) is performed on each of the rows of detectors (2) in such a manner that the amount of time consumed for each TDI is the same for each row.

BRIEF DESCRIPTION OF THE DRAWINGS

These and other more detailed and specific objects and features of the present invention are more fully disclosed in the following specification, reference being had to the accompanying drawings, in which:

FIG. 9 is a side view showing three FPAs 1 of the present invention mounted in the rotating nose 4 of an airplane 8;

FIG. 10 is a plan view of the embodiment of FPA 1 used at position 1 of FIG. 9;

FIG. 11 is a plan view of the embodiment of FPA 1 used at position 2 of FIG. 9; and FIG. 12 is a plan view of the embodiment of FPA 1 used at position 3 of FIG. 9.

BEST MODE FOR CARRYING OUT THE INVENTION

Figure 1:
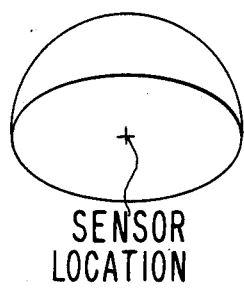
FIG. 1 is a sketch showing the desired hemispherical coverage for a searching sensor.

A problem often encountered with multi-detector imaging sensors is that the user desires the sensor to detect radiation throughout a hemispherical field of view (FOV). This enables the sensor to detect several targets simultaneously. A typical example is IRST (infrared search and track). The sensor may be responsive to infrared radiation or to electro-optic (visible and/or ultraviolet) radiation. A sketch of the desired FOV for such a sensor is shown in FIG. 1.

The prior art uses as the detector portion 13 of the sensor 11 a linear detector array or a linear focal plane array (FPA) scanned in orthogonal axes. In the case of a focal plane array 13, preamplifiers and multiplexers are integrated with the individual detector elements 12 to reduce the number of wires.

Figure 2:
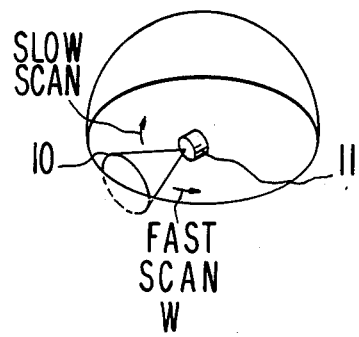
FIG. 2 is a sketch showing the coverage 10 obtained by a prior art sensor 11 in a horizontal position.
Figure 3:
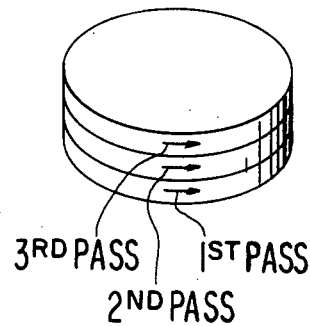
FIG. 3 is a sketch showing the coverage of sensor 11 of FIG. 2 as it steps from a horizontal to a vertical position.
Figure 4:
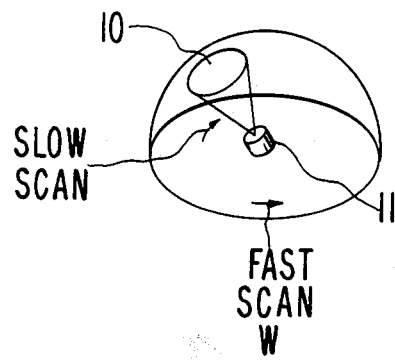
FIG. 4 is a sketch showing the coverage 10 of sensor 11 of FIG. 2 in a near vertical position.

An example of a prior art configuration is shown in FIG. 2, wherein sensor 11 is mounted on a two degree of freedom gimbal. The instantaneous FOV 10 is seen to be conical in shape. Sensor 11 is free to rotate 360° about a first axis at a relatively fast angular rate W, and is free to rotate 180° about a second, orthogonal axis at a relatively slow scan rate. If this second degree of freedom is stepped, the resulting scan is as illustrated in FIG. 3, whereby each pass corresponds to a step in the second scan direction. The resulting scan is seen to comprise a series of stacked disks. This approach works well for the first pass or even the first several passes, but works less and less well as sensor 11 approaches the upright position as illustrated in FIG. 4.

This performance impairment is particularly significant when sensor 11 comprises a focal plane array 13 utilizing time delay integration (TDI), because of decreasing TDI efficiency. For the first pass, the lines of integration (direction of scan of the imaged target across the detector array 13) cross the columns of detectors 12 perpendicularly, so that the FPA 13 is scanned properly. TDI is able to work properly because of constant sensitivity with respect to each of the detector elements 12; the angular coverage rate is nearly constant for all of the detector elements 12, and one obtains the same sensitivity throughout the subfield of view.

Figure 5:
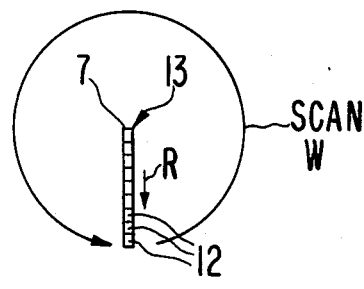
FIG. 5 is a plan view of detector 13 of the prior art in a full vertical position when detector 13 comprises a single row of detector elements 12.
Figure 6:
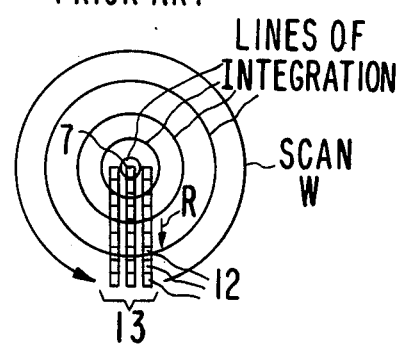
FIG. 6 is a plan view of detector 13 of the prior art in a full vertical position when detector 13 comprises several rows of detector elements 12.

However, when sensor 11 is in a vertical position the situation is not favorable. This is illustrated in FIGS. 5 and 6 for a single row 13 of detectors 12 and for a FPA 13, respectively. In each Figure, the observer is looking down onto the detector array 13. The detector elements 12 are scanned at very different linear scan rates because of the constant angular velocity W of the spinning platform which supports the sensor 11, and because of the fact that different detector elements 12 are at different distances R from the spin axis 7. As a result, the detectors 12 that are closer to spin axis 7 have much greater sensitivity than detectors 12 remote from spin axis 7. The situation does not improve by adding additional rows of detectors 12 in a conventional TDI format because the lines of integration are not aligned with the corresponding ordinal detector 12 in all of the columns of detectors 12. Thus, a requirement for conventional TDI is not satisfied.

The present invention rectifies these difficulties experienced by the prior art by making uniform the resolution and sensitivity throughout a nearly hemispherical FOV.

Figure 7:
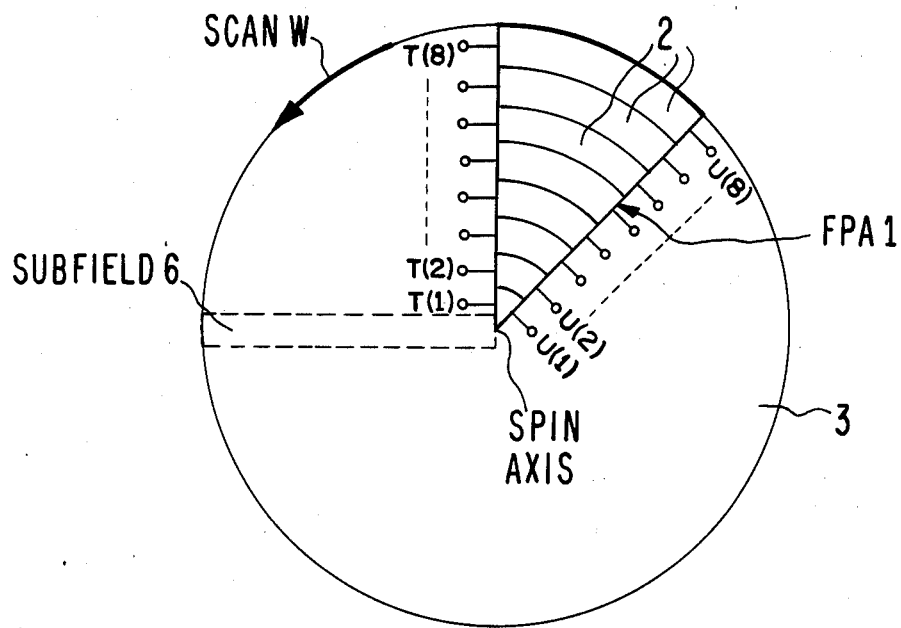
FIG. 7 is a plan view of focal plane array (FPA) 1 of the present invention in a first embodiment wherein FPA 1 comprises several continuous detector elements 2.

A first embodiment of the present invention is illustated in FIG. 7, in which the sensor comprises a planar focal plane array (FPA) 1 mounted on a platform 3 which spins at a constant angular velocity W about a spin axis. Optics associated with the sensor focus the incident radiation on FPA 1, which comprises several arcuate detector elements 2. FPA 1 can be said to be continuous in the circumferential direction and discrete in the radial direction.

In essence, detectors 2 are curved versions of the linear SPRITE (Signal PRocessing In The Element) detectors of the prior art. FIG. 7 illustrates the case where eight detectors 2 are employed. Applied across each detector 2 via a first terminal T and a second terminal U, attached at opposite ends thereof, is a d.c. bias voltage. The photocarriers produced as a result of the detection move through the continuous detector 2 at a rate proportional to this applied voltage. It is necessary to set these eight voltages at eight different levels, to result in equalization of the time required for the photocarriers in each detector 2 to travel across the respective detector 2. Thus, analog time delay integration (TDI) is performed for each detector 2.

By this method, the sensitivity is equalized for each of the detectors 2, because each detector 2 spends the same amount of time observing each subfield of view 6 of the overall FOV. The resolution is also constant throughout each subfield 6. Each subfield 6 is a radially elongated portion of the overall FOV. The eight bias voltages are set so that the time for performing the TDI on each detector 2 is that amount of time required for the detector 2 to pass through the subfield 6. Successive subfields 6 are imaged in this way until the entire FOV has been imaged.

The analog signal representing the radiation detected by each detector 2 can be removed from one of the terminals (T or U) associated with each said detector 2. In this case, the analog signal is superimposed on the d.c. bias voltage.

Figure 8:
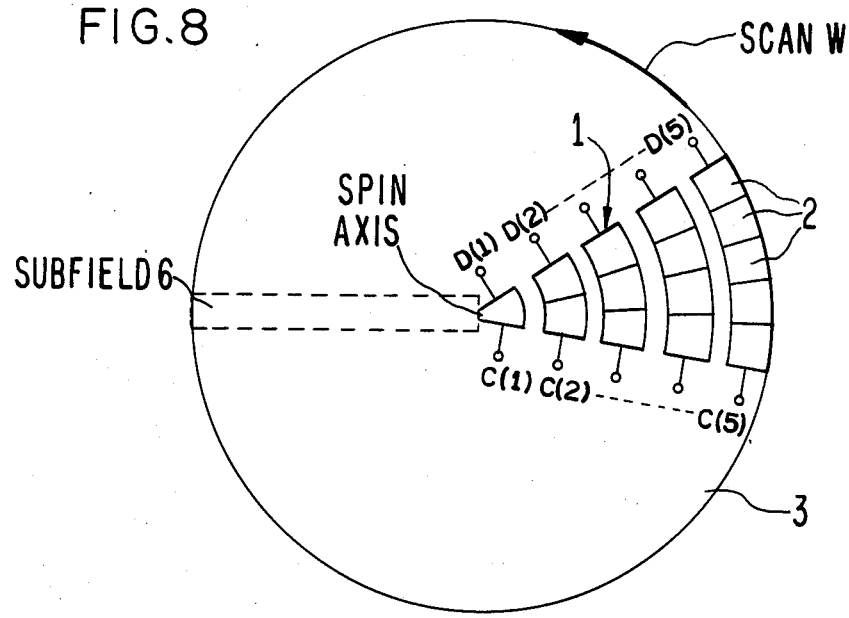
FIG. 8 is a plan view of a second embodiment of the present invention in which FPA 1 comprises many discrete detector elements 2.

FIG. 8 illustrates an embodiment of the present invention identical to that of FIG. 7 except for the following differences. In FIG. 8, the individual detectors 2 are discrete elements having substantially the same size and generally the same shape to maintain constant resolution throughout the FOV. In the illustrated configuration, the detector elements 2 are arranged into five arcuate rows. Each row is clocked by a separate clock comprising, e.g., a binary waveform. The clocks are administered at terminals C(1) through C(5), corresponding to the five rows of detector elements 2. Digital TDI is performed on each row, all in the same elapsed time. This equalizes the sensitivity for each portion of the viewed subfield 6. The overall sensitivity is higher because of TDI. The edge detectors 2 have the highest rate of scan and the greatest number of detectors 2 in their TDI; TDI makes up for the relatively short dwell times on these detectors 2. The sole detector 2 in row 1 has the highest dwell time and the smallest number of detectors (one) for its TDI. Row 1 could be made to have more than one detector 2.

To illustrate TDI for row 5, for example, the five electrical signals emanating from the five detectors 2 of that row are time-phased and added together. These signals can be extracted from terminal D(5) associated with row 5. (Terminals D(1) through D(4) are used to extract the signals associated with rows 1 through 4, respectively.)

The five clock frequencies are made to be different so that the overall elapsed time of taking the measurements is the same for each row. This elapsed time is equal to the time required for each row to traverse subfield 6. For example, the clock rate for the fifth row is five times the clock rate for the first row.

The embodiments illustrated in FIGS. 7 and 8 work very well when the radiation is normal or near normal to the plane of the FPA 1. This is very useful for forward aspect searches when the sensor is mounted at the nose of an airplane 4, as illustrated in FIG. 9. Prior art sensors often exhibit a singularity along the line of flight, which is often the region of most interest.

When the incident angle is oblique, the sensor does not work as well, and so FPA 1 can be tilted with respect to platform 3 to restore the angle of incidence to near 90°. Alternatively or in addition, several FPA's 1 can be utilized, each making a different angle with respect to the overall FOV. Such an arrangement is illustrated in FIG. 9, in which three FPA's 1(1), 1(2), and 1(3) are utilized, at positions 1, 2, and 3, respectively, each forming a different angle with respect to the longitudinal axis of a carrier vehicle 8, which is preferably an airplane, but may also be a ship, missile, tank, truck, etc. In the illustrated embodiment, the entire nose 4 of airplane 8 rotates about said longitudinal axis. Thus, nose 4 is platform 3, and the longitudinal axis is the spin axis. Window 5 in nose 4 is translucent to radiation at the frequencies of interest. Providing three FPA's 1 in this fashion increases the effective overall FOV, with excellent forward imaging.

The three FPA's 1 of FIG. 9 have different shapes, illustrated in FIGS. 10, 11, and 12, respectively. The shape of FPA 1(1) is seen to be a sector of a circle, i.e., a three-sided figure in which two of the sides are straight lines meeting at a point, and the third line is an arc of a circle whose radius is equal to the length of each of the two straight lines. The two straight lines meet at a point that lies on the spin axis.

The shape of FPA 1(3) is seen to be a rectangle.

The shape of FPA 1(2), which is suitable for any FPA 1 mounted at a field angle of between 0° and 90°, is a four-sided figure. Two of the sides are straight lines and two of the sides are conic sections which are joined by each of the two straight lines. By "conic section" is meant a parabola, circle, ellipse, or hyperbola.

Thus, in the general case (which covers all three of the illustrated FPA's 1), it can be said that FPA 1 is planar and has the shape of a sector of a figure formed by one or two conic sections. By "sector" as used herein is meant that FPA 1 has three or four sides, and two of the sides are straight lines. These straight lines connect at a point when FPA 1 is a three-sided figure. When FPA 1 is a four-sided figure, two of the sides are conic sections and the two straight lines each connect the two sections.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A rotating sensor for imaging throughout a nearly hemispherical field of view with substantially constant resolution and sensitivity, said sensor comprising:
    a platform which rotates about a spin axis at a constant angular rate;
    mounted on the platform, a planar multi-detector array having the shape of a sector of a figure formed by up to two conic sections, said array comprising many detectors arranged in rows generally following the curvature of the conic sections; and
    means for performing time delay integration (TDI) on each of the rows of detectors in such a manner that the time consumed for each TDI is the same for each row.

2. The rotating sensor of claim 1 wherein each row comprises one continuous detector; and
    the TDI's are performed in an analog manner by means of applying different voltages across each detector.

3. The rotating sensor of claim 1 wherein each row comprises several discrete detectors;
    all of the detectors in the array have substantially the same size and generally the same shape; and
    the TDI's are performed in a digital fashion by means of clocking signals emanating from the detectors at different rates for each row.

4. The rotating sensor of claim 1 wherein each row except for a first row comprises several discrete detectors;
    the first row is the row nearest the spin axis and comprises one detector;
    all of the detectors in the array have substantially the same size and generally the same shape; and
    the TDI's are performed in a digital fashion by means of clocking signals emanating from the detectors at different rates for each row.

5. The rotating sensor of claim 1 wherein the array has the shape of a sector of a circle; and
    the field of view comprises a cone whose principal axis is aligned with the spin axis.

6. The rotating sensor of claim 1 wherein the array has the shape of a four-sided figure whose sides are two conic sections and two straight lines; and
    the field of view comprises a first cone nulled by a second cone, wherein:
    the first and second cones each have their principal axes aligned with the spin axis;
    the apices of the first and second cones are coincident; and
    the first cone is bigger than the second cone.

7. The rotating sensor of claim 1 wherein the sensor is responsive to radiation in the infrared portion of the electromagnetic spectrum.

8. The rotating sensor of claim 1 wherein the sensor is responsive to radiation in the electro-optic portion of the electromagnetic spectrum.

9. The rotating sensor of claim 1 wherein the time consumed for each TDI is the time required for each row of detectors to scan through a radially elongated subfield of the field of view.

* * * * *